United States Patent
Gracia Verdugo et al.

(10) Patent No.: US 10,744,757 B2
(45) Date of Patent: Aug. 18, 2020

(54) DECEL CORRECTION IN A PRINTER

(71) Applicant: HEWLETT-PACKARD DEVELOPMENT COMPANY, L.P., Spring, TX (US)

(72) Inventors: Antonio Gracia Verdugo, San Cugat del Valles (ES); Pau Costal, Sant Cugat del Valles (ES); David Toussaint, San Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/327,392

(22) PCT Filed: Oct. 26, 2016

(86) PCT No.: PCT/US2016/058782
§ 371 (c)(1),
(2) Date: Feb. 22, 2019

(87) PCT Pub. No.: WO2018/080468
PCT Pub. Date: May 3, 2018

(65) Prior Publication Data
US 2019/0240973 A1  Aug. 8, 2019

(51) Int. Cl.
*B41J 2/045* (2006.01)
*B41J 2/175* (2006.01)
*B29C 64/112* (2017.01)
*B41J 29/38* (2006.01)
*B41J 2/21* (2006.01)

(52) U.S. Cl.
CPC ......... *B41J 2/04505* (2013.01); *B29C 64/112* (2017.08); *B41J 2/0458* (2013.01); *B41J 2/04581* (2013.01); *B41J 2/175* (2013.01); *B41J 2/2135* (2013.01); *B41J 29/38* (2013.01)

(58) Field of Classification Search
CPC .. B41J 2/2135; B41J 2/04568; B41J 2/04505; B41J 2/0458; B41J 2/04581; B41J 2/175; B41J 129/38; B41J 2/145; B29C 64/112
See application file for complete search history.

(56) References Cited

U.S. PATENT DOCUMENTS 6,572,223 B2   6/2003   Delametter et al.
6,669,317 B2   12/2003  Linder et al.
(Continued)

OTHER PUBLICATIONS

Hill, T.Y. et al. Controlling Inkjet Fluid Kinematics to Achieve SOFC Cathode Micropatterns, Jan. 23, 2015.

*Primary Examiner* — Thinh H Nguyen
(74) *Attorney, Agent, or Firm* — HP Inc. Patent Department

(57) ABSTRACT

A printer includes a print head to print by ejecting drops of a printing fluid;, a memory to store a correction measure, the correction measure to modify printing a pattern to compensate for decel, and a processor. The processor analyzes print data for a pattern that, when printed using the print head, triggers decel, controls the print head to eject drops of the printing fluid in accordance with the print data, when the analysis indicates that the pattern to be printed triggers decel, applies the correction measure upon printing the pattern, and, when the analysis indicates that the pattern to be printed does not trigger decel, does not apply the correction measure upon printing the pattern.

15 Claims, 7 Drawing Sheets

(56) References Cited

U.S. PATENT DOCUMENTS

| | | |
|---|---|---|
| 7,004,556 B2 | 2/2006 | Cleland et al. |
| 7,611,217 B2 | 11/2009 | Shamoun et al. |
| 9,352,561 B2 * | 5/2016 | Harjee ........................ B41J 2/07 |
| 2002/0118237 A1 | 8/2002 | Linder et al. |
| 2005/0074267 A1 | 4/2005 | Demchock et al. |
| 2013/0201241 A1 | 8/2013 | Hayashi et al. |
| 2015/0174821 A1 | 6/2015 | Levine et al. |
| 2019/0299592 A1 * | 10/2019 | Iwasaki ................ B41J 2/17596 |

* cited by examiner

DECEL CORRECTION IN A PRINTER

BACKGROUND

A printer, for example, an inkjet-printer or a 3-dimensional printer, ejects drops of a printing fluid from a print head towards a pixel on a medium. Printing a pattern may include the continuous thing of the print head of the printer, which may cause a loss of drop velocity and drop weight of a drop of the printing fluid.

BRIEF DESCRIPTION OF THE DRAWINGS

FIG. 1 shows an example of different patterns to illustrate decel and the associated misalignment of the drops when being placed on a medium, wherein FIG. 1(A) shows a first pattern printed at a first firing frequency, FIG. 1(B) shows a second pattern printed at a second firing frequency, and FIG. 1(C) is an enlarged representation of the vertical straight lines of the first and second patterns.

DETAILED DESCRIPTION

In the following description, details are set forth to provide an understanding of the examples described herein. However, it is to be understood that the examples may be practiced without these details. While a limited number of examples are disclosed, it is to be understood that there are numerous modifications and variations therefrom. Similar or equal elements in the figures may be indicated using the same numeral.

A printer uses a printing fluid, also referred to as a printing material, such as an ink or a fusing agent. The printer may by an inkjet-printer, such as a thermal inkjet-printer or a piezoelectric inkjet-printer. Depending on the pattern to be printed, the print head may be operated continuously for some time, i.e., drops of the printing fluid are ejected at a high firing frequency. In such printing conditions, a transitory phenomenon may occur that is referred to as decel or decel-effect. Decel may occur when repeatedly firing or activating a nozzle of a print head of an inkjet printer for long time periods. In such a situation, a thin film of ink components may form and deposit over a nozzle resistor. When the nozzle stops printing, the film disappears after some time, however, when the nozzle keeps printing for a long period of time, the film does not disappear. The film causes energy to be transmitted to the nozzle less efficiently so that the drop which is fired from the nozzle has less momentum when compared to a drop fired by a nozzle in which no such film is present. The reduced momentum causes the drop weight and the drop velocity to be reduced so that the drop is decelerated, when compared to the situation in which no thin film is formed and in which the drop has a nominal weight and velocity. Drops of the printing fluid with less drop velocity than the nominal drop velocity cause the drop to have a longer flying time so that it lands on the medium with a misalignment when compared to a nominal drop. This misalignment may result in visible artefacts, for example in a printed image, or may result in the application of a fusing agent in areas of a powder layer in a 3D printing process which is not to be solidified.

Figure 1:
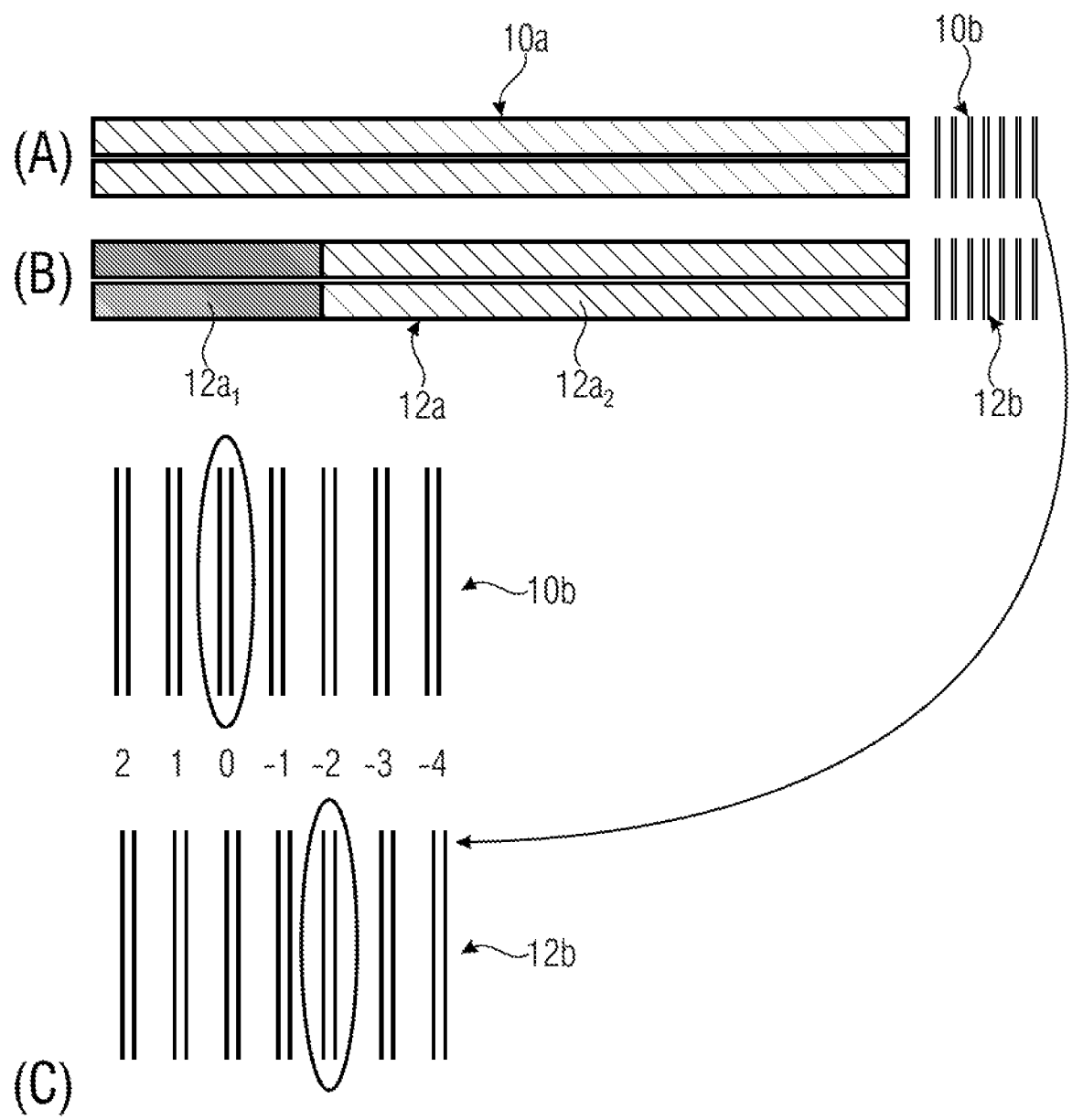

FIG. 1 shows an example of different patterns to illustrate decel and the associated misalignment of the drops when being placed on the medium. FIG. 1(A) shows a first pattern printed at a first firing frequency. The first pattern has a first section $10a$ printed continuously, followed by a second section $10b$ including seven pairs of parallel, vertical lines. FIG. 1(B) shows a second pattern printed at higher firing frequencies when compared to the first pattern. The second pattern includes a first section $12a$ and a second section $12b$. The first section $12a$ has a first subsection $12a_1$ and a second subsection $12b_2$. In the first subsection $12a_1$ the density of the applied ink is higher when compared to the first pattern. The second section $12b$ includes, in a similar way as the first pattern in FIG. 1(A), seven pairs of parallel vertical straight lines. FIG. 1(C) is an enlarged representation of the second sections $10b$ and $12b$ of the first and second patterns. Using the vertical straight lines printed for the different pattern, a misalignment due to decel may be seen. For example, in a situation in which no decel is triggered by the second pattern the vertical pairs of straight lines of the first and second patterns are aligned at position 0 in FIG. 1(C), also, referred to as reference position. However, in the example depicted in FIG. 1 the second pattern, due to its higher firing frequency of the nozzles to apply the increased amount of ink in the first and second subsections $12a_1$, $12a_2$, causes decel, and the vertical straight lines in sections $10b$, $12b$ are no longer aligned at position 0, rather, the vertical pair of straight lines are aligned with respect to each other at position −2 in FIG. 1(C). Thus decel when printing the second pattern leads to a misalignment of the ink drops with respect to the reference position 0. Decel may be addressed by providing correction factors when printing. The corrections may be fixed and may be applied at any time of printing so that visible misalignments due to decel are avoided.

It was found that there patterns in which nozzles are fired continuously but which do not trigger decel. For such patterns applying a decel correction may cause visible deteriorations in the printout as the correction is applied although decel is not triggered. Such patterns may include, for example, the printing or small letters or when printing a minimum saturated area fill. For example, when applying the decel correction for printing small characters, due to the correction the dots are not placed correctly and the characters may appear blurred.

Figure 2A:
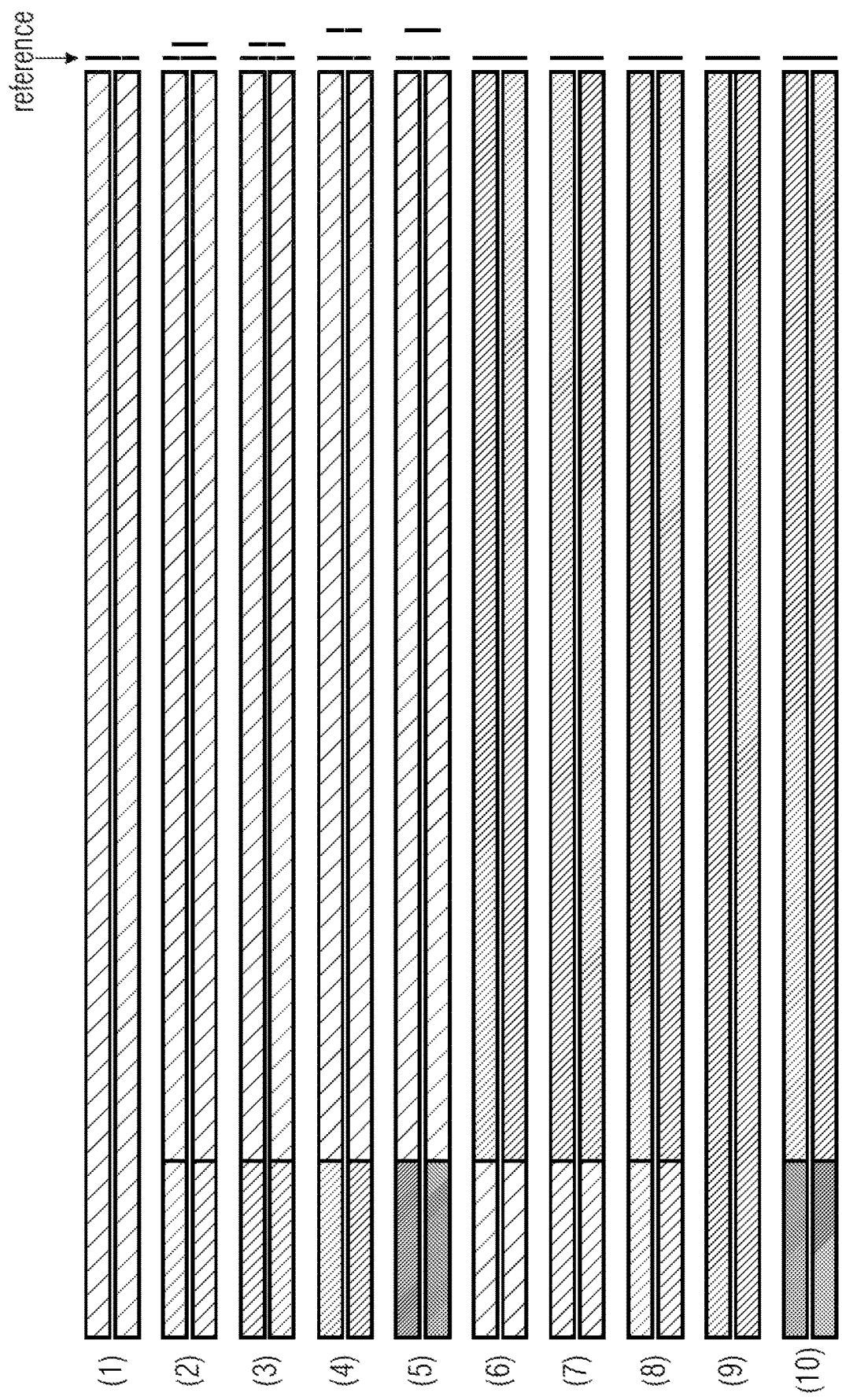
FIG. 2(A) shows ten examples of different patterns printed by firing nozzles of an inkjet print head to eject a specific amount of ink towards a medium.

FIG. 2(A) shows ten examples of different patterns printed by firing nozzles of an inkjet print head to eject a specific amount of ink towards a medium. Pattern (1) is printed at a low firing frequency. On the right side of the pattern a vertical line is printed. The vertical line has three elements all of which are in alignment with the reference position. The pattern (1) does not cause a misalignment, i.e., decel is not triggered when printing pattern (1). The patterns (2) to (10) are printed with different firing frequencies when compared to pattern (1) to obtain the more saturated areas in the respective pattern. On the right side of the pattern (2) a vertical line is printed. The vertical line has two elements which are not in alignment with the reference position which is indicated by the vertical dotted line. The pattern (2) causes a misalignment, i.e., decel is triggered when printing pattern (2). Also the patterns (3) to (5) trigger decel, as may be seen from the misalignment of the vertical line elements from the reference position. The patterns (2) and (3) cause a misalignment which is smaller than the misalignment in patterns (4) and (5). The patterns (6) to (10) do not cause a misalignment, as may be seen from the vertical line elements at the right end of the pattern which are in alignment with the reference position, i.e., the patterns (6) to (10) do not trigger decel.

Figure 2B:
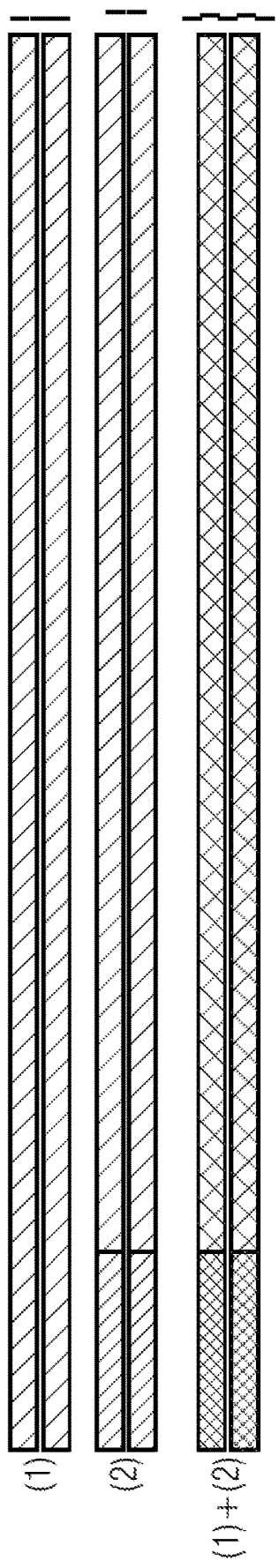
FIG. 2(B) describes an example to print the patterns (1) and (2) shown in FIG. 2(A) during a calibration for a diagnostic for decel.

FIG. 2(B) describes an example to print the patterns (1) and (2) shown in FIG. 2(A) during a calibration for a diagnostic for decel. FIG. 2(A). The patterns (1) and (2) are shown individually. The pattern (1) does not trigger decel, while the pattern (2) triggers decel. With each pattern the vertical line elements are printed together with the pattern. The three vertical line elements of the pattern (1) and the two vertical line elements of the pattern (2) are printed. With no decel triggered by the pattern (2) the vertical line elements of both patterns match and form one straight line. When decel is triggered, a stepped vertical line is revealed because of the different drop velocity. To evaluate the pattern (2), both patterns (1) and (2) are printed on the medium without advancing the medium so that the patterns overlap as shown by pattern (1)+(2) in FIG. 2(B). As may be seen from the combined pattern (1)+(2), the vertical line elements do not match but are stepped, i.e., pattern (2) provokes decel. With the determined misalignment of the vertical line elements, a correction measure to overcome the drop velocity change driven by decel may be determined. In accordance with examples, more than one vertical line may be printed for determining a misalignment of different patterns printed, for example, seven pairs of vertical lines may be printed, as is shown in FIG. (1). The pattern (1) may include less than three or more than three vertical line elements. The other patterns may include less than two or more than two vertical line elements.

Figure 3:
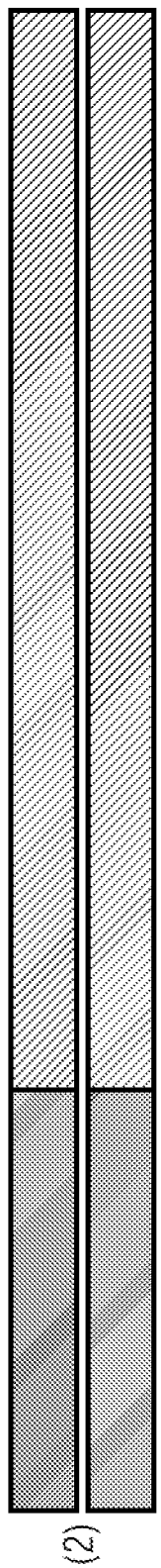
FIG. 3 shows an example of the results of a measurement of pattern (2) of FIG. 2(A) indicating the ink densities in different regions measured by a densitometer.

The patterns described with reference to FIG. 2(A) may be analyzed with respect to the ink distribution along the pattern, and FIG. 3 shows an example of the results of a measurement of, for example, pattern (2) of FIG. 2(A) indicating the ink densities in the different regions measured by a densitometer, which may be internal to a printer. The printer is a carriage printer and the pattern (2) is printed as the print head is moved along the scan axis to apply the ink. In the areas of the pattern (2) having high densities, the print head is fired with a higher frequency than in those areas where the density is low. The scan axis may be segmented into 15 segments or portions, and each number in FIG. 3 indicates the ink density or ink level, for example in drops*100/600 ths. Whether a print pattern triggers decel or not is determined using this information. During a calibration process patterns as shown in FIG. 2(A) may be printed and measured, for example by a densitometer, to determine, using the densities and ink distributions, those patterns which trigger decel and those patterns which do not trigger decel. During the calibration process, correction factors may be calculated to correct the amount of misalignment caused.

In accordance with the techniques described herein, misalignments due to a decel correction, in situations when no decel is triggered, are avoided by monitoring a pattern to be printed, for example by monitoring an amount of ink to be fired per pass to determine whether a printing follows a specific pattern in terms ink amount and ink distribution along a scan axis, to see whether the printed pattern causes or triggers decel. Dependent on whether decel is triggered or not, a dynamic correction is applied or not to avoid misalignment in sensitive areas.

Figure 4:
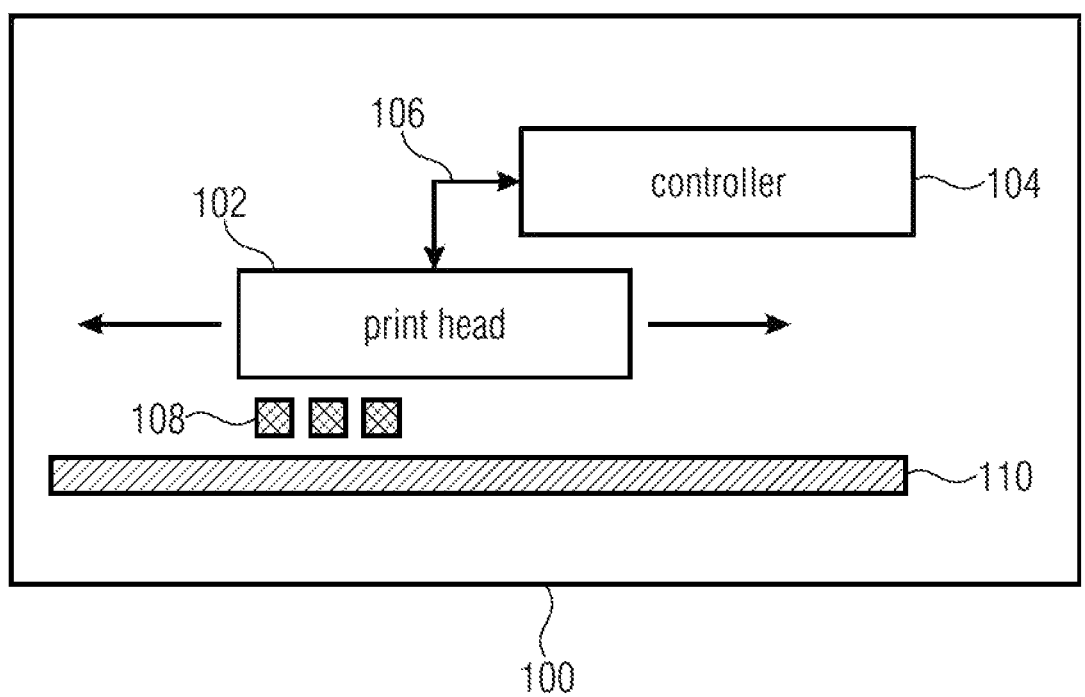
FIG. 4 is a schematic representation of a printer in accordance with an example.

FIG. 4 is a schematic representation of a printer in accordance with an example. The printer 100 includes a print head 102 including a plurality of nozzles. The print head 102 may be a thermal print head in which respective resistors are provided in the nozzles to cause ejecting a drop of an ink or other printing fluid by energizing the resistor responsive to control signals provided by a controller 104 via a line 106. The respective print head nozzles, when being energized, cause the ejection of ink drops 108 to print a specific area or pixel on a print medium 110 that is supplied to the printer 100. The print head 102 may be mounted to a carriage to be moved width-wise across the print medium 110, as is indicated by the arrows pointing to the left and to the right in FIG. 4. In accordance with other examples, the printer 100 may be a page wide array printer in which the print head is stationary and spans the entire width of the print medium 110. In accordance with other examples, the print head may be a piezoelectric print head in accordance with which the ink drops 108 are generated by deflecting a membrane formed in the nozzle due to the piezoelectric effect by applying an activation signal over the line 106 from the controller 104. In accordance with yet other examples, the printer 100 may be a 3-D printer. 3-dimensional printing, also referred to as additive manufacturing, rapid prototyping or solid free-form fabrication, is a technology for manufacturing a variety of objects. The printer 100 may generate objects through a selective solidification of successive layers of a build material, such as a powder material or a fiber material. A fusing agent which is applied a layer of the build material to define areas in the non-solidified build material layer to be solidified by applying energy to the layer.

In accordance with examples of the technology described herein, the printer 100 comprises the print head 102 to print a pattern. Printing the pattern includes applying an amount of printing material, such as ink, to the medium. The controller 104 includes a memory to store a correction measure to modify the printing of the pattern to compensate for decel. The memory 152 may also store calibration data that may be used for analyzing print data for a patterns triggering decel. The controller includes a processor to analyze print data for a pattern that, when printed using the print head, triggers decel, control the print head to eject drops of the printing fluid in accordance with the print data, when the analysis indicates that the pattern to be printed triggers decel, apply the correction measure upon printing the pattern, and when the analysis indicates that the pattern to be printed does not trigger decel, not apply the correction measure upon printing the pattern. Misalignments of drops on the medium are avoided by applying the correction measure in situations in which decel actually occurs, thereby providing a better image quality of the printed image in terms of grain, banding and color differences. A correction of decel is avoided when it is determined that the pattern to be printed does not cause decel so that any corrections leading to other visible effects in a printed image are avoided. For example, avoiding the decel correction when printing patterns including, e.g., small characters, the characters are printed without blur. In other words, in accordance with the techniques described herein, counterproductive correction measures are avoided, when no decel is triggered. The techniques described herein determine whether decel is present and whether a correction is to be applied or not. In case decel actually occurs, the image quality is maintained by dynamically changing the alignment position.

In accordance with further examples, also the print head usage or printed lifetime may be monitored, as decel may be more prominent with an increase in the print head age and there may be situations where the decel correction is no longer possible by modifying the correction measures. A user of the printer may be alerted accordingly to indicate that decel may no longer be overcome and that additional actions may be considered.

Figure 5:
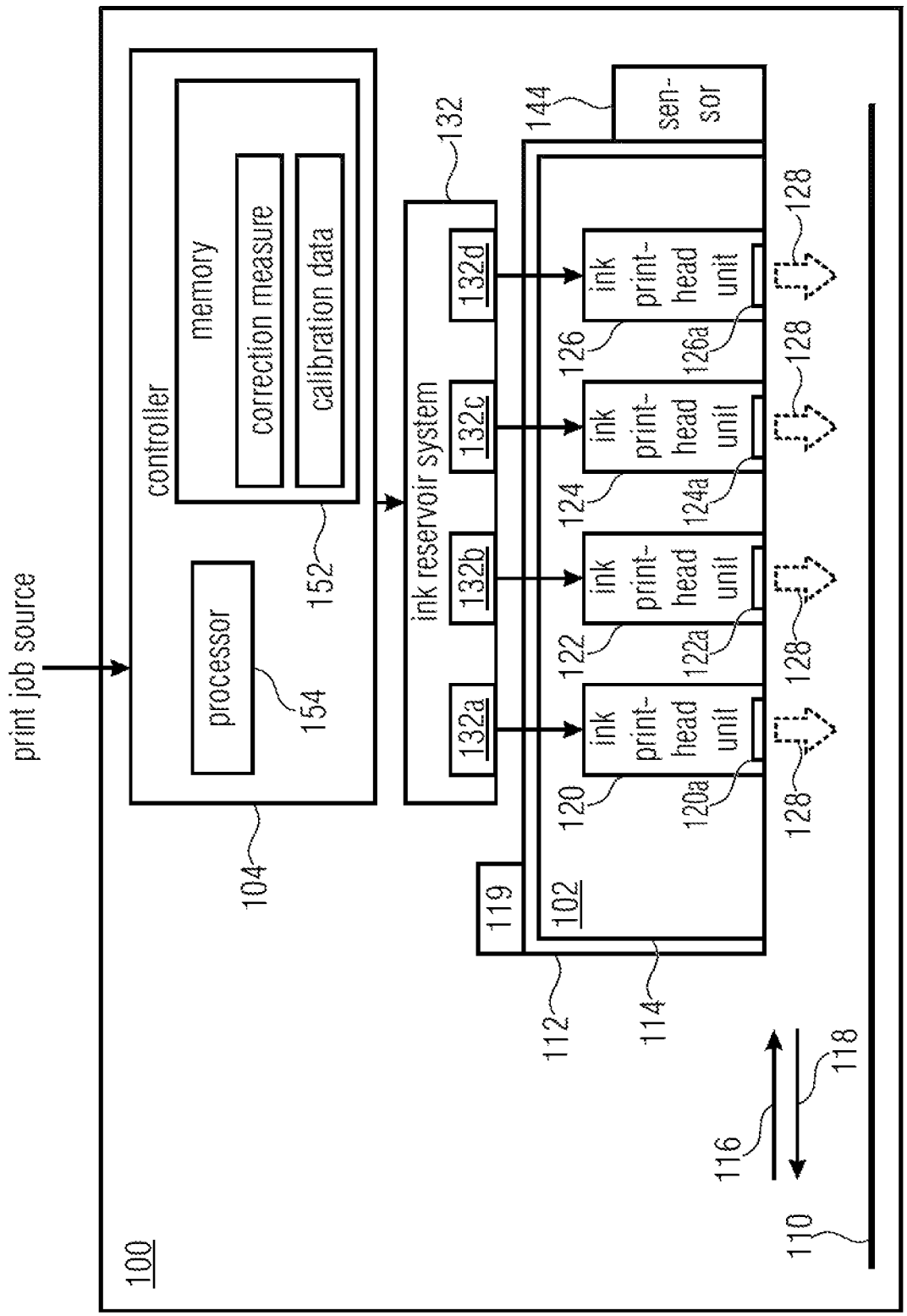
FIG. 5 shows a carriage inkjet-printer in accordance with another example.

FIG. 5 shows a carriage inkjet-printer in accordance with another example. The printer 100 includes a carriage 112 with a print head receiving assembly 114 to receive the print head 102. The carriage 112 is to transition the print head 102 across the width of the print medium 110, also referred to as a substrate, along the print head transition directions 116, 118. For example, a drive 119 may be coupled to the carriage 112 to effect the carriage transition. The printer 100 may perform printing across the width of the medium 110 by a corresponding translation of the carriage 112. In the example of FIG. 5, the print head 102 includes a plurality of ink print head units 120 to 126. Each of the ink print head units 120 to 126 includes respective ink nozzle array arrangements 120a to 126a to eject ink drops 128. The ink print head units 120 to 126 are fluidically connected to an ink reservoir system 132. The ink reservoir system 132 includes ink reservoirs 132a to 132d for providing ink to the respective ink print head units. In accordance with examples, the ink reservoirs 132a to 132d may store cyan ink, magenta ink, yellow ink and black ink. Base colors may be reproduced on the medium 110 by depositing a number of ink drops of one of the inks at a specific medium location, also referred to as a pixel. Other colors may be reproduced by combining inks from different ink print head units, for example, by depositing drops of different base colors on adjacent dot locations in the pixel. In accordance with, other examples, less ink print head units as depicted in FIG. 5 or more ink print head units and associated ink reservoirs may be provided, for example, a CcMmKY printer may include further ink reservoirs for light cyan (c) and light magenta (m). The reservoirs may be mounted on the carriage 112 in a position adjacent to the respective print heads. In accordance with other examples, the reservoirs may not be mounted on the carriage 112 and may be connected to the print head units on the carriage by means of a fluid supply. Such a system is also referred to as an off axis system. In accordance with other examples, fluids different from inks may be provided through one of the print heads or by print head units, for example, a pre-treatment fluid, such as a fixer, and/or a post-treatment fluid, such as a coating.

The print head units may be monolithically integrated in the print head or may be modularly implemented in the print head so that each print head unit 120 to 126 may be individually replaced. The print head 102 may be a disposable print element or a fixed print element designed to last for the whole operating life of the printer 100.

The printer 100 includes a sensor 144 attached to the carriage 112 to move together with the carriage 112. The sensor 144 may be provided to measure a colorimetric parameter associated with an ink drop number, such as lightness, chroma values or optical density. The sensor 144 may measure values of the colorimetric parameter on medium locations or pixels across the medium 110. In accordance with examples, the sensor 144 may include a spectrophotometer, a densitometer or any other optical sensor for measuring a colorimetric parameter.

The controller 104 of the printer 100 is operatively connected to the previously described elements of the printer. The controller 104 includes a memory 152 and a processor 154 to process print jobs received from a print job source. The memory 152 may include computer readable instructions for controlling the processor 154 to execute methods as described herein.

In the printers according to the of examples FIG. 4 and FIG. 5, the correction measure may include applying a correction factor which cause an activation signal to be shifted with respect to a reference time. The shift may be realized by changing a print head encoder position along a print pass. In accordance with other examples, a speed of moving the print head across the medium may be decreased, or a speed of moving the medium past the print head may be decreased.

In accordance with other examples, the correction measure may be a precursor activation signal that is applied in the case of determining that decel is triggered by a specific pattern. The precursor activation signal is applied prior to the activation signal or main activation signal which causes a drop of printing fluid to be fired from the print head. Applying the precursor prior to the actual activation signal reduces or avoids decel. In accordance with the techniques described herein, precursor activation signal may be applied selectively dependent on whether a pattern to be printed is determined to trigger decel or not.

In accordance with yet other examples, decel may be addressed by providing a decel-alleviating component to the ink. For example, in the printer of FIG. 5, two of the ink reservoirs may be provided to hold ink of, for example, the same color, however, in one reservoir the ink is provided without the decel-alleviating component, whereas in the other reservoir the ink includes the decel-alleviating component. Dependent on whether it is determined that a pattern to be printed triggers decel or not, the respective ink including the decel-alleviating component or the ink not including this component is selected for printing the pattern so that potential issues that may result from adding the decel-alleviating component do not occur when printing patterns in which decel does not occur or is not triggered.

Figure 6:
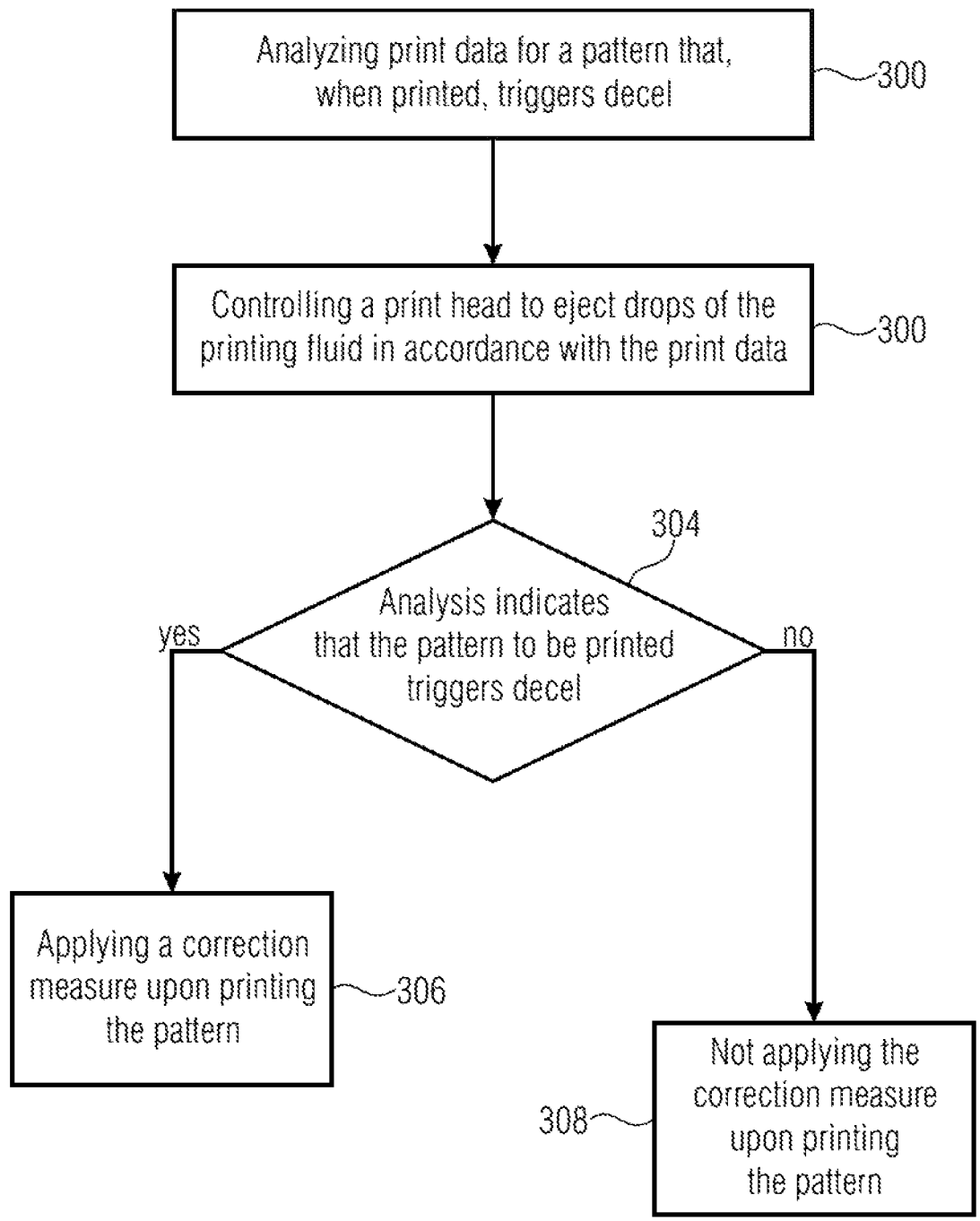
FIG. 6 is a flow diagram of an example of a method described herein.

FIG. 6 illustrates a method in accordance with the techniques described herein. Print data, received by a printer controller, is analyzed 300 for a pattern that, when printed, triggers decel. The analysis may be performed on the fly, i.e., upon receiving the print data and prior to printing an image. For example, the analysis may be performed for print data that is to be printed later, e.g. a number of passes after the current print pass. The print head is controlled 302 to eject drops in accordance with the received print data. It is determined 304 whether the analysis shows that the pattern triggers decel and in case that it does, when printing the pattern a correction measure is applied 306. When it is determined that he pattern does not se decel no correction measure 308 is applied when printing the pattern.

Although some aspects sf the techniques described herein described in the context of an apparatus, these aspects may also represent a description of the corresponding method, where a block or device corresponds to a method block or a feature of a method block. Analogously, aspects described in the context of a method also represent a description of a corresponding block or item or feature of a corresponding apparatus.

Examples described herein may be realized in the form of hardware, machine readable instructions or a combination of hardware and machine readable instructions. Any such machine readable instructions may be stored in the form of volatile or non-volatile storage, for example, a storage device such as a ROM, whether erasable or rewritable or not, or in the form of a volatile memory, for example, RAM, memory chips device or integrated circuits or an optically or magnetically readable medium, for example, a CD, DVD, magnetic disc or magnetic tape. The storage devices and storage media are examples of machine readable storage that is suitable for storing a program or programs that, when executed, implement examples described herein.

All of the features disclosed in this specification, including any accompanying claims, abstract and drawings, and/or all of the method or process so disclosed may be combined in any combination, except combinations where at least some of the features are mutually exclusive. Each feature disclosed in this specification, including any accompanying claims, abstract and drawings, may be replaced by features serving the same, equivalent or similar purpose, unless expressly stated otherwise. Thus, unless expressly stated otherwise, each feature disclosed is one example of a generic series of equivalent or similar features.

The invention claimed is:

1. A printer, comprising:
    a print head to print by ejecting drops of a printing fluid,
    a memory to store a correction measure, the correction measure to modify printing a pattern to compensate for decel, and
    a processor to:
        analyze print data for a pattern that, when printed using the print head, triggers decel,
        control the print head to eject drops of the printing fluid in accordance with the print data,
        when the analysis indicates that the pattern to be printed triggers decel, apply the correction measure upon printing the pattern, and
        when the analysis indicates that the pattern to be printed does not trigger decel, not apply the correction measure upon printing the pattern.

2. The printer of claim 1, wherein the pattern includes an amount of printing fluid and distribution of the printing fluid.

3. The printer of claim 2, wherein the processor is to determine from the print data the amount of printing fluid for printing the pattern and the distribution of the printing fluid along a print pass.

4. The printer of claim 1, wherein the processor is analyze the print data for the pattern while a preceding pattern is printed.

5. The printer of claim 1, wherein the correction measure includes
    a correction factor to cause
        an activation signal to be shifted with respect to a reference time, the activation signal causes a drop of the printing fluid to be fired from the print head,
        causes a decrease of a speed of moving the print head across a medium, or
        causes a decrease of a speed of moving the medium past the print head; or
    a precursor activation signal electrical to be applied to the print head prior to the activation signal.

6. The printer of claim 5, wherein the activation signal is shifted with respect to a reference time by changing a print head encoder position along a print pass.

7. The printer of claim 1, wherein the processor is to control the print head to print the pattern in a plurality of print passes, and to apply the correction measure for a whole print pass.

8. The printer of claim 1, wherein decel is the loss of drop velocity and weight during continuous firing of the print head.

9. The printer of claim 1, comprising a plurality of printing fluid reservoirs, a first printing fluid reservoir to store a first printing fluid with a decel-alleviating component, and a second printing fluid reservoir to store the first printing fluid without the decel-alleviating component,
    wherein the correction measure includes
        to print the first printing fluid with the decel-alleviating component, when the analysis indicates that the pattern to be printed triggers decel, and
        to print the first printing fluid without the decel-alleviating component, when the analysis indicates that the pattern to be printed does not trigger decel.

10. The printer of claim 1, wherein the processor is to monitor a usage of the print head usage,
    when the usage is below a threshold, modify the stored correction measure to compensate for an increase of decel over the print head life time, and
    when the usage is above a threshold, alerting the user that a print degradation due to decel reached a non-compensable level.

11. The printer of claim 1, comprising a controller, the controller including the processor and the memory, the memory to store a plurality of correction measures for different print modes, and the controller to select a correction measure for a currently used print mode.

12. The printer of claim 1, wherein
    the printer includes an inkjet-printer,
    the inkjet-printer includes a carriage inkjet-printer or a page wide array inkjet-printer,
    the inkjet-printer includes a thermal inkjet-printer or a piezoelectric inkjet-printer, and
    the printing fluid includes an ink.

13. The printer of claim 1, wherein
    the printer includes a 3D-printer,
    the printer includes a carriage 3D-printer or a page wide array 3D-printer, and
    the 3D-printer includes a thermal 3D-printer or a piezoelectric 3D-printer, and
    the printing fluid includes fusing agent.

14. A method, comprising:
    analyzing print data for a pattern that, when printed using the print head, triggers decel,
    controlling a print head to eject drops of the printing fluid in accordance with the print data,
    when the analysis indicates that the pattern to be printed triggers decel, applying a correction measure upon printing the pattern, and
    when the analysis indicates that the pattern to be printed does not trigger decel, not applying the correction measure upon printing the pattern.

15. A non-transitory machine-readable storage medium comprising instructions executable by a processing resource of a computing device to cause the processing resource to:
    analyze print data for a pattern that, when printed using the print head, triggers decel,
    control the print head to eject drops of the printing fluid in accordance with the print data,
    when the analysis indicates that the pattern to be printed triggers decel, apply the correction measure upon printing the pattern, and
    when the analysis indicates that the pattern to be printed does not trigger decel, not apply the correction measure upon printing the pattern.

* * * * *